United States Patent
Meijer et al.

(10) Patent No.: US 7,933,483 B2
(45) Date of Patent: Apr. 26, 2011

(54) ELECTRO-OPTICAL MEMORY CELL

(75) Inventors: Gerhard Ingmar Meijer, Zurich (CH); Paul A Moskowitz, Yorktown Heights, NY (US); Thilo Hermann Curt Stoeferle, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/785,007

(22) Filed: May 21, 2010

(65) Prior Publication Data
US 2010/0296788 A1    Nov. 25, 2010

Related U.S. Application Data (63) Continuation-in-part of application No. 12/353,517, filed on Jan. 14, 2009, now Pat. No. 7,724,999.

(30) Foreign Application Priority Data

Jan. 16, 2008 (EP) .................................. 08100566

(51) Int. Cl.
- G02B 6/00 (2006.01)
- G02B 6/10 (2006.01)
- G02F 1/035 (2006.01)
- G02F 1/295 (2006.01)

(52) U.S. Cl. .............. 385/129; 385/2; 385/8; 385/9; 385/130; 385/131; 385/132; 385/142; 385/144

(58) Field of Classification Search .............. 385/2, 8, 385/9, 129–132, 142, 144
See application file for complete search history.

(56) References Cited

U.S. PATENT DOCUMENTS

| | | | |
|---|---|---|---|
| 3,883,220 | A | 5/1975 | Taylor |
| 4,787,691 | A | 11/1988 | Lorenzo et al. |
| 5,436,919 | A | 7/1995 | Chwalek et al. |
| 6,628,450 | B2 | 9/2003 | Samara-Rubio |
| 6,661,556 | B2 | 12/2003 | Bond et al. |
| 7,009,750 | B1 | 3/2006 | Westfall et al. |
| 7,142,760 | B2 | 11/2006 | Tuller et al. |
| 7,190,849 | B2 | 3/2007 | Katase |
| 2003/0090286 | A1 | 5/2003 | Samara-Rubio |
| 2006/0055745 | A1* | 3/2006 | Yagi ................................ 347/71 |
| 2008/0149911 | A1 | 6/2008 | Karg et al. |

* cited by examiner

*Primary Examiner* — Ryan Lepisto
*Assistant Examiner* — Jerry Blevins
(74) *Attorney, Agent, or Firm* — Vazken Alexanian (57) ABSTRACT

An electro-optical memory cell having a non-volatile programmable refractive index and a method of making. The memory cell includes: a waveguiding structure having a transition metal oxide with oxygen vacancies; a plurality of electrodes for applying an electrical field; and an optical detector for detecting a state of the memory cell. The method includes: fabricating a waveguiding structure having a transition metal oxide with oxygen vacancies; positioning a plurality of electrodes for application of an electric field; arranging the transition metal oxide and the electrodes such that when an electric field is applied, the oxygen vacancies migrate in a direction that has a component which is radial relative to a center of the beam path; applying the electric field thereby programming the refractive index to set a state of the memory cell; and detecting the state of the memory cell using an optical detector.

20 Claims, 4 Drawing Sheets

Snell's law: $n_1 \sin\theta_1 = n_2 \sin\theta_2$    or, equivalently,    $\sin\theta_1 / \sin\theta_2 = v_1 / v_2$

ELECTRO-OPTICAL MEMORY CELL

CROSS-REFERENCE TO RELATED APPLICATION

This application is a Continuation-In-Part and claims priority from U.S. application Ser. No. 12/353,517 filed Jan. 14, 2009, which claims priority under 35 U.S.C. §119 from European Patent Application No. 08100566.2 filed on Jan. 16, 2008. The entire contents of both applications are incorporated herein by reference.

BACKGROUND OF THE INVENTION

1. Field of the Invention

This invention relates to an electro-optical memory cell with an electric-field induced modification of an optical property, such as, refractive index. More particularly, this invention relates to an electro-optical memory cell with a non-volatile programmable refractive index.

2. Description of Related Art

Electro-optical devices such as switches, filters, tunable lasers, etc., that are characterized by the use of an electric-field induced modification of a refractive index are known, for example, from U.S. Pat. No. 3,883,220, from U.S. Pat. No. 4,787,691, and from U.S. Pat. No. 7,009,759. These optical elements include crystalline insulating materials such as $LiNbO_3$, exhibiting a pyroelectric effect, semiconducting materials such as Si, exhibiting a plasma dispersion effect, or including a layered Li-Ion-accumulator-like structure where a Li ion migration can contribute to a change of refractive index.

A main drawback of these optical elements is that the electric power has to be applied permanently to keep the change in refractive index, that is, these electro-optical elements are "volatile". A further disadvantage is that electro-optical elements including crystalline materials suffer from polarization dependency, birefringence, which requires additional structures to re-attain polarization-independent device operation.

Moreover, crystalline materials require a large thermal budget and therefore cannot be integrated through back-end-of-line (BEOL) fabrication. In addition, the above mentioned electro-optical elements including semiconducting materials or Li ions are only suited for the infrared wavelength region, as they can strongly absorb visible light.

An example of a non-volatile electro-optical switch is disclosed in U.S. Pat. No. 6,628,450. This example includes floating charge modulated regions to be charged across tunneling barriers. This example, however, relies on free electrons in semiconducting material and is therefore limited to infrared wavelengths and brings about comparably high absorption. Also, it has a complicated structure with several interfaces that can contribute to scattering. Finally, the voltage to be applied across two tunneling barriers taught by U.S. Pat. No. 6,628,450 is substantial.

Despite availability of variety of non-volatile electro-optical devices, such as those described in the commonly owned U.S. application Ser. No. 12/353,517 filed Jan. 14, 2009, there are few reports of electro-optical memory cells that operate by an electric-field induced modification of an optical property, such as, refractive index. However, there are no reports of electro-optical memory cells which have a non-volatile programmable refractive index.

Accordingly, it is desirable to provide a device that has a simple construction with few layer-to-layer interfaces and is well-suited for use in transmission of light in the infrared or visible range of the spectrum.

SUMMARY OF THE INVENTION

The present invention provides such an electro-optical device which has a non-volatile programmable refractive index and is suitable for use as a non-volatile memory cell.

According to one aspect, the present invention provides an electro-optical memory cell with a non-volatile programmable refractive index. The non-volatile programmable electro-optical memory cell includes:

a waveguiding structure with waveguiding material, the waveguiding structure defining an optical beam path in the electro-optical device memory cell, wherein the waveguiding structure includes a transition metal oxide with oxygen vacancies that are capable of migrating when exposed to an electrical field;

a plurality of electrodes for applying an electrical field to a region including the transition metal oxide with oxygen vacancies; and an optical detector for detecting a state of the memory cell;

wherein the transition metal oxide and the electrodes are arranged such that under the applied electric field the oxygen vacancies are caused to migrate in a direction that has a component which is radial relative to a center of the beam path.

According to another aspect, the present invention provides a method of making an electro-optical memory cell with a non-volatile programmable refractive index. The method non-volatile programmable electro-optical memory cell includes:

fabricating a waveguiding structure having a waveguiding material, wherein the waveguiding structure defines an optical beam path and includes a transition metal oxide with oxygen vacancies which migrate when exposed to an electric field;

positioning a plurality of electrodes for application of an electric field to a region having the transition metal oxide with oxygen vacancies;

arranging the transition metal oxide and the electrodes such that when an electric field is applied, the oxygen vacancies migrate in a direction that has a component which is radial relative to a center of the beam path;

applying the electric field thereby programming the refractive index to set a state of the memory cell; and detecting the state of the memory cell using an optical detector.

BRIEF DESCRIPTION OF THE DRAWINGS

In the following, embodiments of the invention will be described referring to the accompanying drawings. The drawings are all schematic and not to scale. In the drawings, the same reference numerals refer to the same or corresponding elements.

DETAILED DESCRIPTION OF THE PREFERRED EMBODIMENTS

The approach of the invention is based on the insight that the index of refraction of the transition metal oxides can depend on the oxygen vacancy concentration. Therefore, optical properties of the waveguiding structure can be influenced by the electric field.

Notably, by this construction, switching pulses of opposing polarities can be applied to the electrodes, the switching pulses causing the oxygen vacancies to migrate into the beam path/closer to the beam path or out of the beam path/away from the beam path, respectively. In the following description the different states of the electro-optical device regarding the position of the oxygen vacancies are referred to as "switching states".

For reasons of convenience, it is assumed that there are two defined switching states, a "first" switching state and a "second" switching state. However, the teaching of the invention can be adaptable also to more sophisticated constructions with more than two defined switching states.

Oxygen vacancies in transition metal oxides have the property that if they are integrated in the transition metal oxide's crystal lattice, they are immobile absent an electric field. Therefore, the assumed switching state is truly non-volatile; once the electrode voltage is turned off, the oxygen vacancies remain in their position for an indefinitely long time, without tending to systematically diffuse, as long as no electric field is applied.

Preferably, the transition metal oxide material is material with a comparably high mobility of oxygen vacancies of $10^{-9}$ $cm^2/Vs$ or higher. Also, the fact that the voltage can be turned off after the switching process underscores the advantage that no unnecessary heat is produced by the device. Thus, lower power consumption is an advantage.

The transition metal oxide and the electrodes are arranged such that under the applied electric field the oxygen vacancies are caused to migrate in a direction that has a component which is radial relative to a center of the beam path.

Further, crystalline and amorphous transition metal oxide layers are straightforward to manufacture. In fact, manufacturing know-how for manufacturing structured layers on common substrates already exists from ferroelectric memory manufacturing, and crystalline and amorphous transition metal oxide layers are usable both in the visible and the infrared part of the spectrum. Notably, amorphous transition metal oxides do not exhibit any birefringence. They can be integrated in back end of the line (BEOL) processing and thus are also suitable of being manufactured in stacked arrangements. According to the approach of the invention, since only voltage pulses are required for changing between switching states, no thermal cross-talk occurs between adjacent optical elements and nearby electric circuitry.

The waveguiding structure can be located on a substrate. A semiconductor substrate, such as a doped silicon substrate, can be used. Also electrically insulating substrates, such as glass substrates or plastic substrates can be used. The waveguiding structure can include further layers on a surface of the substrate. For such layered structures, directions parallel to the substrate surface are denoted "horizontal" or "lateral", while "vertical", as well as "above"/"on top of" or "below"/"underneath" denote directions substantially perpendicular to the substrate. "Above" and "on top of" relate to positions further away from the substrate, and "below" and "underneath" refer to positions closer to the substrate. If configured as such a layered structure, a waveguiding structure can include a plurality of vertically stacked layers, where at least one of the layers is horizontally structured to define the beam path.

Preferably, in a layered structure, the electrodes for applying the switching pulses are arranged in different layers, different vertical positions, and are vertically distanced from each other, so that the radial direction in which the oxygen vacancies migrate is a vertical direction. In case the substrate is electrically conducting—for example if it is doped silicon or another doped semiconductor or if it is metallic—the substrate itself can serve as a first electrode. A second electrode can then be constituted by a layer above the waveguide core. Such a vertical electrode arrangement is most flexible and compatible with state-of-the-art manufacturing methods and is preferred.

"Radial" in the above sense does not mean that the direction of movement is necessarily on a ray from the center of the beam path outward, but rather pertains to all directions having an according component, so that a distance between the beam path center and the oxygen vacancies is caused to vary as the oxygen vacancies migrate.

As an alternative in a layered waveguiding structure, the electrode arrangement can also be horizontal, i.e., the electrodes can include two laterally distanced electrodes, such as conducting strips, operable to shift the oxygen vacancies horizontally relative to the beam path.

The waveguiding structure can include, as is known in the art, a waveguide core of a material with a first refractive index and a waveguide cladding, that is also transparent for the guided light, but that has a second refractive index lower than the first refractive index. The transition metal with the oxygen vacancies can, according to the invention, be the waveguide core material or a constituent of the core, the waveguide cladding or a constituent of the cladding, or both. The waveguide core and the cladding can include transition metal oxide material, and the oxygen vacancies can migrate across an interface between them. In all cases, the two switching states differ from each other in that the oxygen vacancies are at places of different intensity of the guided light. More precisely, the flux, defined as a scalar quantity, of the light field through the cross section area that is inhabited by the oxygen vacancies is different between the two switching states.

While it is possible that the oxygen vacancies can migrate across an interface, it is often preferred to have a configuration where this is not the case and where the oxygen vacancies are shifted within a substantially homogeneous material region. Moreover, in general, it is preferred to arrange the constituents of the electro-optical device in a manner such that the oxygen vacancies do not migrate between sections in which the index of refraction for the guided light is substantially different. It is an advantage of the invention that such arrangements are readily possible since neither constantly applied voltages nor interfaces that will have in influence on optical properties if separating materials of different refractive indexes are required for the oxygen vacancies to be kept in their place after switching.

The beam path defined by the waveguiding structure can be such that in one of the two switching states the structure is resonant for the guided radiation. The optical beam path can be defined such that the waveguiding structure is at or outside of a resonance. For example, the waveguiding structure can include a ring resonator, where the ring resonator includes a section that includes the transition metal oxide as a part of the cladding and/or of the waveguide core.

The electro-optical element can be used as a component of an optical switch or filter. Also, the electro-optical element can be used as a wavelength tuning element, for example, for a laser or for an optical filter. It can also be used as another switching element, for example, for cavity dumping in a laser.

Also further applications of the electro-optical element are possible. For example, because of its non-volatility, it is excellently suited for a task so far not solvable by switching elements. For example, it can be used as a tuning element to compensate for process variability of geometry and refractive index during manufacturing.

Further, it can be used as refractive index stabilization element compensating temperature drifts during operation. In contrast to known solutions using thermal tuning no cross-talk between adjacent optical elements or nearby electric circuitry can occur.

Throughout this text, "light" is used for generally referring to electromagnetic radiation suitable of being guided in a waveguide, and especially includes both, radiation in the visible and in the infrared part of the optical spectrum—and can also be in the near ultraviolet part of the optical spectrum.

Figure 1:
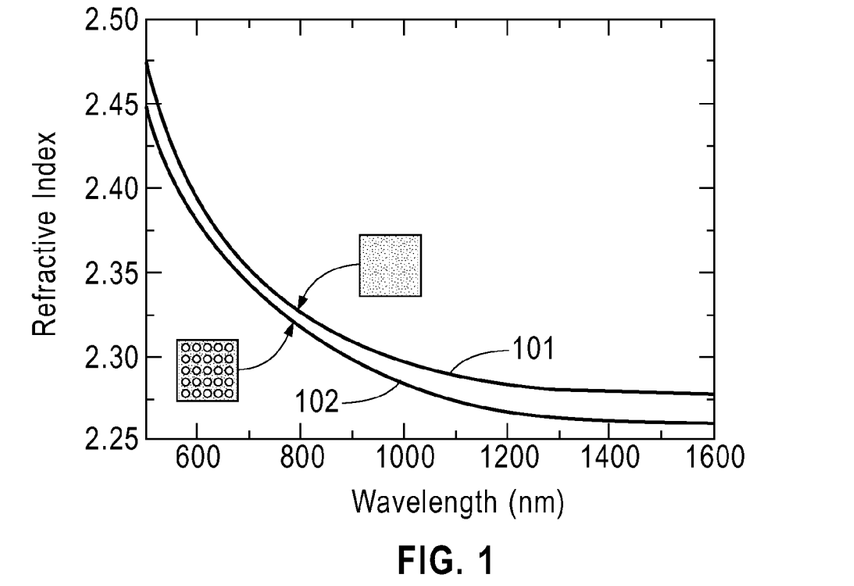
FIG. 1 depicts, as a function of the wavelength, the index of refraction of an exemplary transition metal oxide with and without oxygen vacancies.

FIG. 1 shows the index of refraction of Cr-doped $SrTiO_3$ as a function of the light wavelength. The higher index of refraction curve 101 shows the index of refraction for the material without oxygen vacancies, whereas the lower index refraction curve 102 shows it for an oxygen vacancy concentration. For the material chosen, the refractive index can be programmed between 2.37 and 2.38 at a wavelength of 633 nm, red light, and for example between 2.26 and 2.28 at the IR wavelength 1550 nm, which wavelength is often used for signal transmission in telecommunication devices.

Other high-mobility oxygen ion conducting materials such as $Ce_{0.9}Gd_{0.1}O_{2-\delta}$ with $0<\delta<0.1$ where $\delta$ is the oxygen deficiency of the material, or $Bi_4V_{1.8}Cu_{0.2}O_2O_{10.7}$, fluorite-type oxides with extrinsic oxide-ion vacancies, such as stabilized zirconia $(ZrO_2)_{1-\delta}((Y,Sc)_2O_3)_\delta$, doped ceria $(Ce,Gd)O_{2-\delta}$, $Bi_2O_3$, perovskites with intrinsic or extrinsic vacancies, such as $(La,Sr)(Ga,Mg)O_{3-\delta}$, $BaInO_{2.5}$, $(Li,La)TiO_{3-\delta}$, aurivilius-type oxides, such as $Bi_4(V,Ti.Cu)_2O_{11-\delta}$, pyrochlores, such as $Gd_2(Zr,Ti)_2O_7$, and oxides like $La_2Mo_2O_9$ can also be used advantageously for the present invention. The invention, however, is not restricted to these materials but pertains to any material with suitable transparency and exhibiting an oxygen vacancy concentration controlled index of refraction.

Figure 2A:
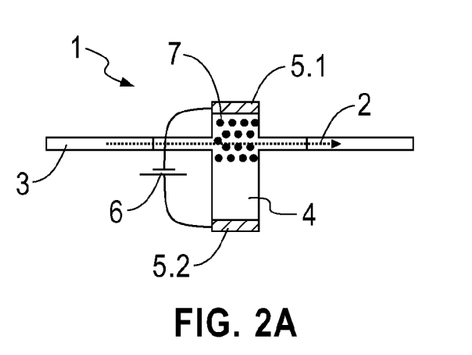
FIGS. 2a and 2b show a schematic of a device according to the invention with the waveguide core having switchable properties.

FIG. 2a illustrates an example of a device 1 according to the invention. The device includes a waveguiding structure defining a beam path 2. The depicted waveguiding structure includes sections 3 where the waveguide core is of a conventional waveguide material and a section 4 where it is of a transition material oxide material of the above-discussed kind with mobile oxygen vacancies 7. The device includes two electrodes 5.1, 5.2, by which the oxygen vacancies 7 can be shifted in and out of the beam path 2 by means of a voltage pulse. The reference numeral 6 in all figures indicates a voltage source of the polarity corresponding to the depicted switching state.

Figure 2B:
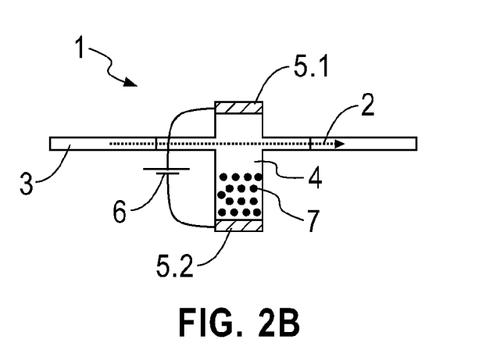

In the first switching state illustrated in FIG. 2a, the oxygen vacancies are in the beam path. FIG. 2b illustrates the second switching state in which the oxygen vacancies are away from the beam path and do not influence the index of refraction in regions where the light beam is guided.

Figure 3A:
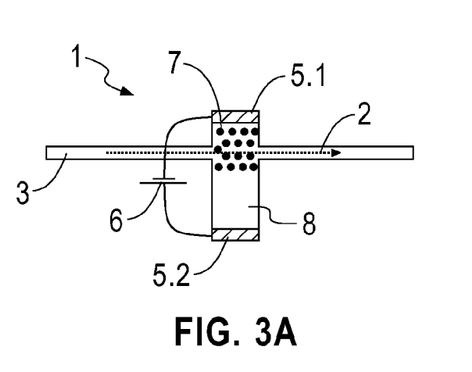
FIGS. 3a and 3b show a schematic of a device according to the invention with the waveguide cladding having switchable properties.
Figure 3B:
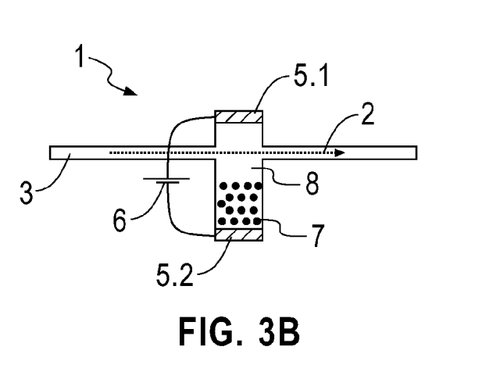

FIGS. 3a and 3b show the two switching states of an alternative embodiment. In contrast to the embodiment of FIGS. 2a and 2b, the waveguide core 3 includes a conventional waveguiding material also in a switching region. However, the waveguide cladding, that is not illustrated in FIGS. 2a and 2b, includes a transition metal oxide portion 8, in which the oxygen vacancies 7 can be shifted by an applied voltage pulse. The principle of the device of FIGS. 3a and 3b is the same as the one of FIGS. 2a and 2b, since the light guided by the waveguiding structure includes portions, also called the evanescent field, that protrude into the cladding material and decay in it in an exponential dependence on the distance to the waveguide core. It is therefore the evanescent light field portions that are influenced by the presence or absence of oxygen vacancies.

Figure 4A:
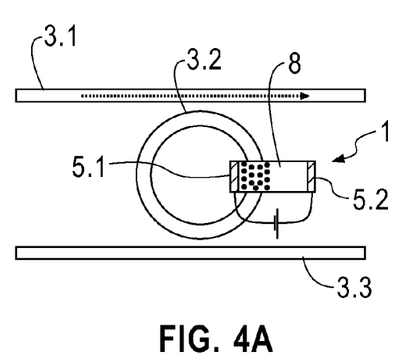
FIGS. 4a and 4b show an exemplary use of a device according to the invention as an optical switch.
Figure 4B:
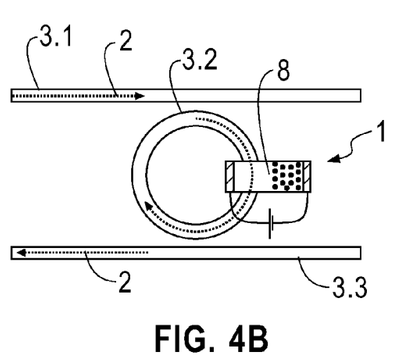

FIGS. 4a and 4b schematically illustrate an example of an optical switch based on a device 1 according to the invention. The optical switch includes a ring resonator that incorporates device 1. Depending on the switching state, the light guided in the first waveguide core 3.1, and the cladding material surrounding it, is transmitted without any influence of the ring resonator, first switching state, FIG. 4a, or, in the second switching state, it is coupled into the ring resonator waveguide core 3.2, and a substantial portion is further coupled into the second waveguide core 3.3 (FIG. 4b).

The structure including a resonator also has the advantage that small differences in the index of refraction can have a strong influence on the state of the waveguiding system as a whole. Instead of providing a resonant structure, other means can be present to bring about the strong influence as required in devices such as switches or filters in contrast to different kinds of tuning elements or disturbance correcting elements. Such other means can include arranging the transition metal oxide with a switchable state over a long portion of the beam path, and/or of providing a transition metal oxide with a strong index contrast, etc.

In the structures of FIGS. 2a-4b, the switching arrangement is depicted as being "horizontal", i.e., if the waveguiding structure is provided on top of a substrate, the oxygen vacancies are shifted in a direction parallel to the substrate surface on which the waveguiding structure is arranged. The illustration as a horizontal switching arrangement has been chosen because designs of the kind of the optical switch can more easily be illustrated that way. However, while a horizontal switching arrangement is indeed possible and is within the scope of the present invention, in most cases vertical switching arrangements in which the oxygen vacancies are shifted substantially perpendicular to the drawing plane of FIGS. 2a-4b are preferred. FIGS. 2a-4b are to be read as pertaining to both horizontal switching arrangements and vertical switching arrangements.

Figure 5A:
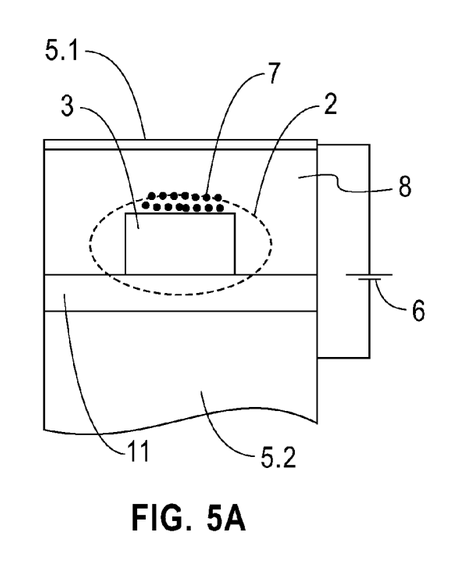
FIGS. 5a and 5b show cross sections of an embodiment of a device according to the invention in the two switching states.
Figure 5B:
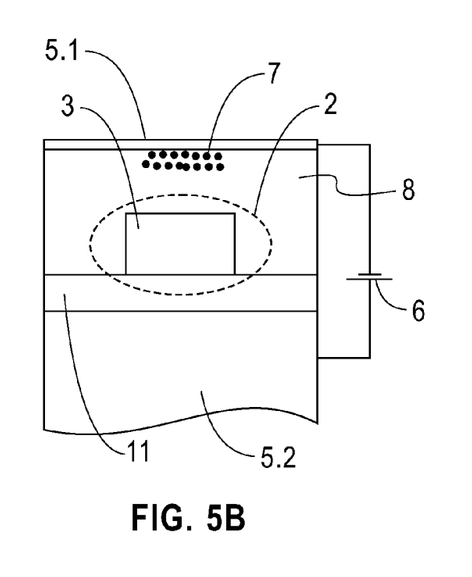

FIGS. 5a and 5b show a cross section through a first embodiment of a vertical switching arrangement. The cross section in these and the following figures pertains to a switching section of the waveguide along the beam path, and usually not to the waveguide over its full length, as shown in FIGS. 2a-4b.

The waveguiding structure includes, on a substrate 5.2 such as a doped silicon substrate, a dielectric spacer layer 11, for example $SiO_2$, and a waveguide core 7, for example undoped silicon for IR light or a suitable dielectric transparent material, for example glass, $TiO_2$ or $Ta_2O_5$, for visible light, etc., that is not susceptible for the oxygen vacancies. The cladding 8 in the switching region is of a transition metal oxide of the described kind. The index of refraction of the waveguide core 3 material is higher than the index of refraction of the cladding 8 and of the dielectric spacer layer 11. On top of the cladding, the structure further includes an electrode 5.1. The other electrode 5.2 can be formed by the substrate itself.

By means of a voltage pulse applied to the two electrodes 5.1, 5.2, the oxygen vacancies 7 in the cladding layer 8 can be caused to migrate between a first switching state (FIG. 5a) in which the oxygen vacancies are close to the waveguide core 3 and are within a region with substantial light intensity, and a second state (FIG. 5b) in which the oxygen vacancies 7 are remote from the beam path 2. In these and the following figures, an optical mode profile of the beam path 2 is illustrated by a dashed line. A skilled person knows that there is no clear border for an optical beam.

Figure 6A:
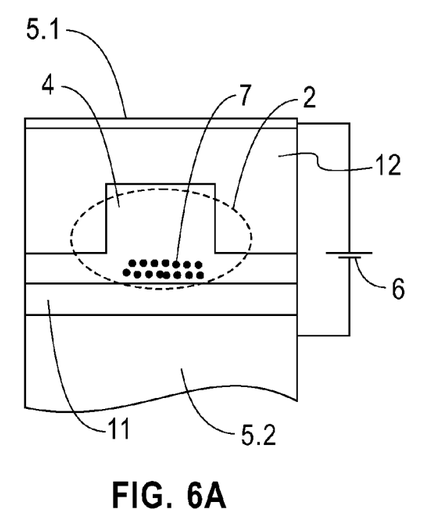
FIGS. 6a and 6b show cross sections of a further embodiment of a device according to the invention in the two switching states.
Figure 6B:
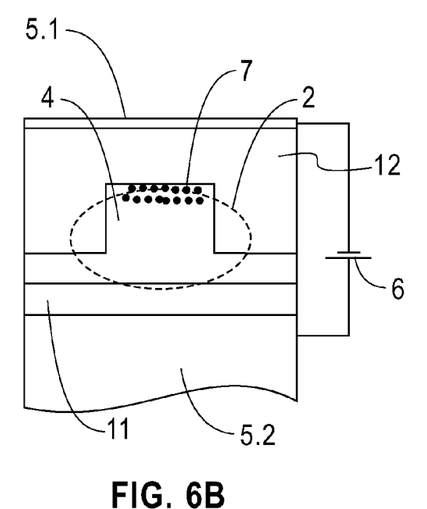

The embodiment described in FIGS. 6a and 6b is distinguished from the embodiment of FIGS. 5a and 5b by two features: The waveguide core material 4 in the switching region is a transition metal oxide, and the cladding 12 is, for example, a conventional cladding material; and the oxygen vacancies are, therefore, shifted within the waveguide core, between locations of different light intensity. The waveguide is a rib waveguide.

It is also possible to implement, starting from the embodiment of FIGS. 5a and 5b, only one of these two features. The first feature, oxygen vacancies in the core especially makes sense if the refractive indexes of the dielectric spacer layer 11 and the cladding layer differ strongly, so that an asymmetric intensity distribution within the waveguide core 3 is attained. The second feature, i.e., rib waveguide, makes sense especially if the difference of the index of refraction between the waveguide core 3 and the cladding is comparably small, so that the mode penetrates relatively far into the cladding material further than illustrated for the case of FIG. 6a, for example. It is also possible to provide oxygen vacancies both in the core and in the cladding. Further, what is illustrated to be a dielectric spacer layer 11 in the figures can be viewed as a part of the cladding and can be made of a transition metal oxide and can include mobile oxygen vacancies.

Figure 7A:
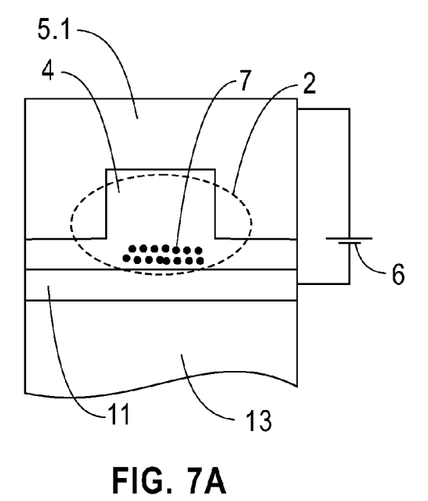
FIGS. 7a and 7b show cross sections of yet another embodiment of a device according to the invention in the two switching states.
Figure 7B:
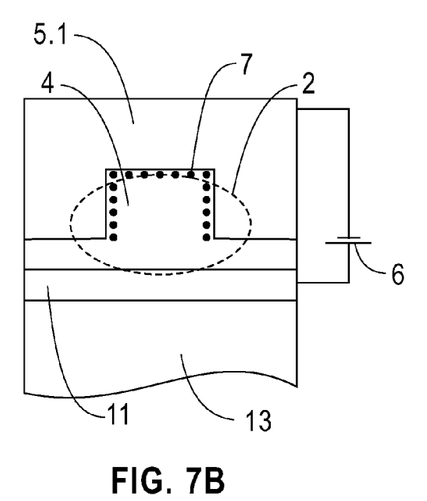

FIGS. 7a and 7b illustrate a variant of the configuration of FIGS. 6a and 6b where the top electrode 5.1 is a transparent electrode, for example, of indium tin oxide (ITO) or of another transparent electrically conducting material, and also serves as the cladding. Also the second electrode 5.2 in the depicted embodiment is chosen to be a transparent electrode, for example also of ITO. Then it replaces the dielectric spacer layer.

While, the optical losses can be slightly higher in such a configuration, there are also advantages. Notably, the voltage used for applying an electric field of the required strength is smaller compared to the above-described embodiments, since the electrodes are substantially closer to the region in which the oxygen vacancies can migrate.

Another advantage is that the substrate does not need to be electrically conducting. Thus, the substrate can for example be a glass plate. Note, however, that a non-conducting substrate can also be used for the configurations of FIGS. 5a, 6b, and their variants. Then, the substrate has to include a conducting, for example metallic, coating, or another layer of the layered structure and the area underneath the waveguide core has to be electrically conducting. Of course, it is also be an option to make only one of the two electrodes 5.1, 5.2 transparent.

The invention can vary from the above-described embodiments in several ways. For example, in the depicted embodiment, the beam path is defined by a laterally structured layer, namely a laterally confined waveguide core or a rib waveguide structure. The invention, however, is not restricted to the shown waveguide structures. Other ways of defining a beam path in a waveguiding arrangement are known in the art, and the invention is suitable for these, too. In case of optically active devices, such as lasers, amplifiers or other light emitting devices, the beam path can, for example, be defined by the structure being a gain guided structure, instead of the discussed index guided structures. The teaching of the invention pertains equally to such structures.

Figure 8A:
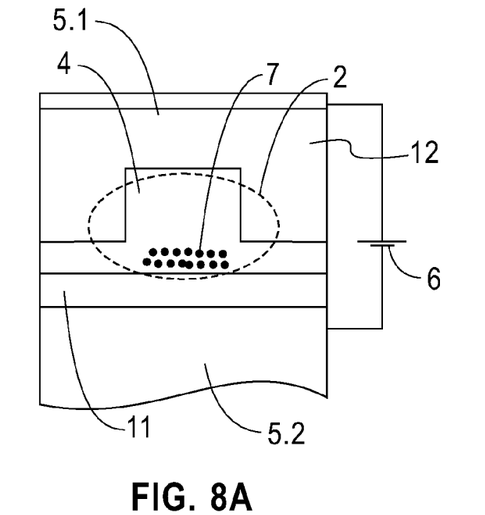
FIGS. 8a and 8b show cross sections of an even further embodiment of a device according to the invention in the two switching states.
Figure 8B:
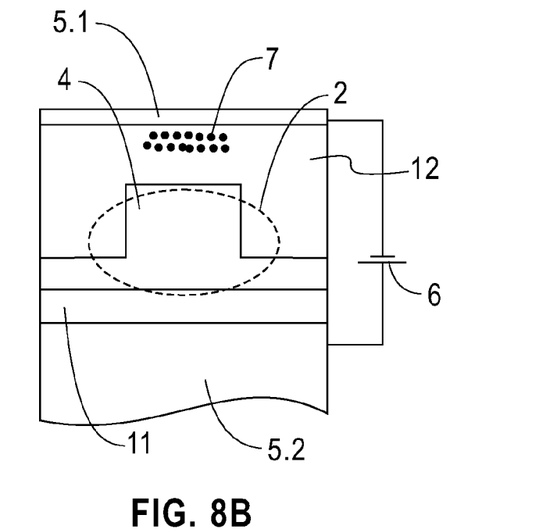

Further, the discussed embodiments include the oxygen vacancies being confined to one material layer only, the neighboring materials being free of oxygen and/or chemically inert to oxygen and/or including substantially lower oxygen mobility, so that the oxygen vacancies cannot penetrate into the neighboring layers. This is not required. Rather, the materials of different constituents of the electro-optical device can be capable of conducting oxygen vacancies, so that the oxygen vacancies can migrate across interfaces. While such an embodiment brings about more restriction in material choice, it can be advantageous in terms of contrast, i.e., in terms of differences between the effective overall refractive index between the first and the second switching state. An embodiment is illustrated as an example in FIGS. 8a and 8b where the oxygen vacancies 7 migrate between the rib waveguide material and the cladding material and can therefore migrate between a position close to the center of the beam path and a position completely outside the beam path. This is in contrast to the embodiment described in FIGS. 6a and 6b.

The present invention additionally provides an electro-optical memory cell with a non-volatile programmable refractive index. The non-volatile programmable electro-optical memory cell includes:

a waveguiding structure with waveguiding material, the waveguiding structure defining an optical beam path in the electro-optical device memory cell, wherein the waveguiding structure includes a transition metal oxide with oxygen vacancies that are capable of migrating when exposed to an electrical field;

a plurality of electrodes for applying an electrical field to a region including the transition metal oxide with oxygen vacancies; and an optical detector for detecting a state of the memory cell;

wherein the transition metal oxide and the electrodes are arranged such that under the applied electric field the oxygen vacancies are caused to migrate in a direction that has a component which is radial relative to a center of the beam path.

The electro-optical memory cell further includes a substrate.

The waveguiding structure includes a stack of laterally structured layers on a surface of the substrate. Plurality of electrodes are positioned in a direction substantially perpendicular to a surface of the substrate.

The waveguiding structure includes: a waveguide core including the transition metal oxide and a cladding at least partially embedding the waveguide core wherein the cladding is impenetrable to the oxygen vacancies.

The waveguiding structure can further include a waveguide core and a cladding at least partially embedding the waveguide core wherein the cladding includes the transition metal oxide, and wherein the waveguide core is impenetrable to the oxygen vacancies.

The waveguiding structure can further include a waveguide core; a cladding at least partially embedding the waveguide core; and an interface between the waveguide core and the cladding that is permeable to the oxygen vacancies; wherein the waveguide core and the cladding include a transition metal oxide with oxygen vacancies that migrate when subjected to an electric field.

Preferably, the transition metal oxide has an oxygen vacancy mobility of at least $10^{-9}$ cm$^2$/Vs and wherein at least one of the electrodes is transparent and is a part of the cladding.

Preferably, the optical beam path is defined such that the waveguiding structure is at or outside of a resonance and further includes a non-volatile programmable refractive index and a detector is for detecting at least two states of the memory cell.

Preferably, an optical detector is used to detect the state of the memory cell. The application of a voltage changes the index of refraction of the device. A beam of light passing through the memory cell emerges at an angle dependant upon the index of refraction of the two media, determined by Snell's law, known since the 1600s, as shown in FIGS. 9*a* and 9*b*.

Figure 9A:
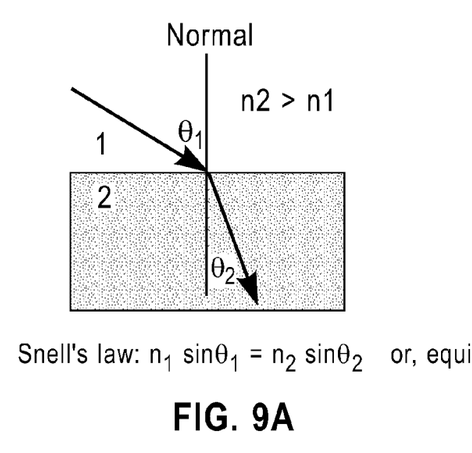
FIGS. 9a and 9b are diagrams which schematically show an optical detector used to detect the state of the memory cell wherein n is the index of refraction of the medium and v is the velocity of light in a specific medium.
Figure 9B:
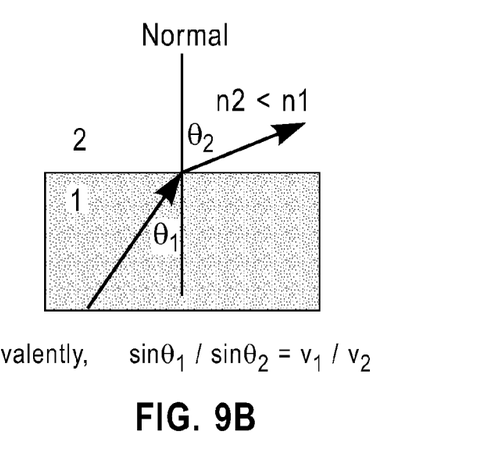

Referring to FIGS. 9*a* and 9*b*, n is the index of refraction of the medium and v is the velocity of light in the medium. The angle of the emerging beam will indicate the state of the memory. The memory can be placed in two or more states. The angle may be determined by placing a number of photo-detectors equal to the number of states, in position to observe the emerging beams.

Alternatively, If the internal index of refraction is greater than the external index, i.e., in FIG. 9*b*, n1 is greater than n2, there is a critical angle, $\theta_1$, at which no beam of light will emerge when $\sin \theta_1 > n2/n1$. This is called total internal reflection. By varying the index of refraction, n1, the light can be made to either emerge or not according to the state of the memory. This can be detected by a standard photocell to show the state of a two-state memory cell.

According to another aspect, the present invention provides a method of making a non-volatile electro-optical memory cell with a non-volatile programmable refractive index. The method includes:

fabricating a waveguiding structure having a waveguiding material, wherein the waveguiding structure defines an optical beam path and includes a transition metal oxide with oxygen vacancies which migrate when exposed to an electric field;

positioning a plurality of electrodes for application of an electric field to a region having the transition metal oxide with oxygen vacancies;

arranging the transition metal oxide and the electrodes such that when an electric field is applied, the oxygen vacancies migrate in a direction that has a component which is radial relative to a center of the beam path;

applying the electric field thereby programming the refractive index to set a state of the memory cell; and detecting the state of the memory cell using an optical detector.

The method can further include: stacking laterally structured layers on a surface of a substrate in the fabrication of the waveguiding structure and positioning the plurality of electrodes in a direction substantially perpendicular to a surface of a substrate.

Preferably, the waveguiding material has a non-volatile programmable refractive index.

The modification of oxygen vacancies migrating across interfaces is also available for the other above-described embodiments. It includes oxygen vacancies migrating across other interfaces, such as the interface to the dielectric spacer layer which is then chosen to be of a material with a high oxygen vacancy mobility. Various further modifications are also possible.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electro-optical memory cell with a non-volatile programmable refractive index, the memory cell comprising:
    a waveguiding structure with waveguiding material, said waveguiding structure defining an optical beam path in said electro-optical device memory cell, wherein the waveguiding structure comprises a transition metal oxide with oxygen vacancies that are capable of migrating when exposed to an electrical field;
    a plurality of electrodes for applying an electrical field to a region comprising the transition metal oxide with oxygen vacancies; and
    an optical detector for detecting a state of the memory cell;
    wherein the transition metal oxide and the electrodes are arranged such that under said applied electric field the oxygen vacancies are caused to migrate in a direction that has a component which is radial relative to a center of the beam path.

2. The electro-optical memory cell according to claim 1, further comprising a substrate.

3. The electro-optical memory cell according to claim 2, wherein the waveguiding structure comprises a stack of laterally structured layers on a surface of the substrate.

4. The electro-optical memory cell according to claim 2, wherein the plurality of electrodes are positioned in a direction substantially perpendicular to a surface of the substrate.

5. The electro-optical memory cell according to claim 1, wherein the waveguiding structure further comprises:
    a waveguide core comprising the transition metal oxide; and
    a cladding at least partially embedding the waveguide core; wherein the cladding is impenetrable to the oxygen vacancies.

6. The electro-optical memory cell according to claim 1, wherein the waveguiding structure further comprises:
    a waveguide core; and
    a cladding at least partially embedding the waveguide core; wherein the cladding comprises the transition metal oxide, and the waveguide core is impenetrable to the oxygen vacancies.

7. The electro-optical memory cell according to claim 1, wherein the waveguiding structure further comprise:
    a waveguide core;
    a cladding at least partially embedding the waveguide core; and an interface between the waveguide core and the cladding that is permeable to the oxygen vacancies;

wherein the waveguide core and the cladding comprise a transition metal oxide with oxygen vacancies that migrate when subjected to an electric field.

8. The electro-optical memory cell according to claim 1, wherein the transition metal oxide has an oxygen vacancy mobility of at least $10^{-9}$ cm$^2$/Vs.

9. The electro-optical memory cell according to claim 1, wherein at least one of the electrodes is transparent and is a part of the cladding.

10. The electro-optical memory cell according to claim 1, wherein the optical beam path is defined such that the waveguiding structure is at or outside of a resonance.

11. The electro-optical memory cell according to claim 1, wherein the waveguiding structure further comprises a non-volatile programmable refractive index.

12. The electro-optical memory cell of claim 1, wherein the optical detector is for detecting at least two states of the memory cell.

13. A method for making an electro-optical memory cell with a non-volatile programmable refractive index, the method comprising:

fabricating a waveguiding structure having a waveguiding material, wherein said waveguiding structure defines an optical beam path and comprises a transition metal oxide with oxygen vacancies which migrate when exposed to an electric field;

positioning a plurality of electrodes for application of an electric field to a region having the transition metal oxide with oxygen vacancies;

arranging the transition metal oxide and the electrodes such that when an electric field is applied, the oxygen vacancies migrate in a direction that has a component which is radial relative to a center of the beam path;

applying the electric field thereby programming the refractive index to set a state of the memory cell; and detecting the state of the memory cell using an optical detector.

14. The method of claim 13, further comprising:
stacking laterally structured layers on a surface of a substrate in the fabrication of the waveguiding structure.

15. The method of claim 14, further comprising:
positioning said plurality of electrodes in a direction substantially perpendicular to a surface of a substrate.

16. The method of claim 14, wherein the waveguiding material has a non-volatile programmable refractive index.

17. The method of claim 13, wherein the transition metal oxide has an oxygen vacancy mobility of at least $10^{-9}$ cm$^2$/Vs.

18. The method of claim 13, wherein at least one of the electrodes is transparent and is a part of the cladding.

19. The method of claim 13, wherein the optical beam path is defined such that the waveguiding structure is at or outside of a resonance.

20. The method of claim 13, wherein the optical detector is for detecting at least two states of the memory cell.

* * * * *